United States Patent
Yamada

(10) Patent No.: US 11,822,799 B2
(45) Date of Patent: Nov. 21, 2023

(54) MEMORY SYSTEM

(71) Applicant: Kioxia Corporation, Tokyo (JP)

(72) Inventor: Tomiyuki Yamada, Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 96 days.

(21) Appl. No.: 17/683,667

(22) Filed: Mar. 1, 2022

(65) Prior Publication Data

US 2023/0093251 A1 Mar. 23, 2023

(30) Foreign Application Priority Data

Sep. 17, 2021 (JP) .................... 2021-152582

(51) Int. Cl.
*G06F 12/00* (2006.01)
*G06F 3/06* (2006.01)
*G06F 12/02* (2006.01)
*G06F 9/455* (2018.01)

(52) U.S. Cl.
CPC .......... *G06F 3/0631* (2013.01); *G06F 3/0604* (2013.01); *G06F 3/0644* (2013.01); *G06F 3/0659* (2013.01); *G06F 3/0673* (2013.01); *G06F 3/0683* (2013.01); *G06F 12/0238* (2013.01); *G06F 2009/45583* (2013.01)

(58) Field of Classification Search
CPC ...... G06F 3/0631; G06F 3/0604; G06F 3/061; G06F 3/0673; G06F 3/0644; G06F 3/0683; G06F 2009/45583; G06F 3/0659; G06F 12/0238
See application file for complete search history.

(56) References Cited

U.S. PATENT DOCUMENTS

| 10,452,604 | B2 | 10/2019 | Liang et al. |
| 2015/0279433 | A1* | 10/2015 | Chinnakkonda Vidyapoornachary ...... G06F 13/1668 711/105 |
| 2018/0285252 | A1 | 10/2018 | Kwon et al. |
| 2019/0347224 | A1 | 11/2019 | Moon et al. |
| 2020/0125261 | A1* | 4/2020 | Byun ............... G06F 3/0679 |
| 2020/0241763 | A1* | 7/2020 | Armangau ......... G06F 3/0683 |
| 2021/0294750 | A1* | 9/2021 | Brigg ................. G06T 1/60 |
| 2022/0147449 | A1* | 5/2022 | Zhao ............... G06F 3/0659 |

* cited by examiner

*Primary Examiner* — John A Lane
(74) *Attorney, Agent, or Firm* — Foley & Lardner LLP

(57) ABSTRACT

A memory system includes a first volatile memory having an access unit of a first bit width; a second volatile memory having an access unit of the first bit width and having a capacity larger than the first volatile memory; and a controller connected to the first and second volatile memories. The controller allocates a first address space having the first bit width as a unit to the first volatile memory, allocates a second address space having the first bit width as a unit to the second volatile memory, selects at least one of the first and second volatile memories based on a first address indicating a position in a third address space having a second bit width as a unit, calculates a second address in the address space allocated to the selected volatile memory, and accesses a position corresponding to the second address of the selected volatile memory.

20 Claims, 9 Drawing Sheets

MEMORY SYSTEM

CROSS-REFERENCE TO RELATED APPLICATION

This application is based upon and claims the benefit of priority from Japanese Patent Application No. 2021-152582, filed Sep. 17, 2021, the entire contents of which are incorporated herein by reference.

FIELD

Embodiments described herein relate generally to a memory system.

BACKGROUND

A memory system including a dynamic random access memory (DRAM) is known.

DETAILED DESCRIPTION

Embodiments provide a memory system that can flexibly change a configuration of a mounted DRAM.

In general, according to at least one embodiment, a memory system includes a first volatile memory having an access unit of a first bit width; a second volatile memory having an access unit of the first bit width and having a capacity larger than the first volatile memory; and a controller connected to the first and second volatile memories. The controller allocates a first address space having the first bit width as a unit to the first volatile memory, allocates a second address space having the first bit width as a unit to the second volatile memory, selects at least one of the first and second volatile memories based on a first address indicating a position in a third address space having a second bit width different from the first bit width as a unit, calculates a second address in the address space allocated to the selected volatile memory, and accesses a position corresponding to the second address of the selected volatile memory.

Hereinafter, memory systems according to embodiments are described in detail with reference to the accompanying drawings. The present disclosure is not limited to these embodiments.

(Configuration Example of Memory System)

Figure 1:
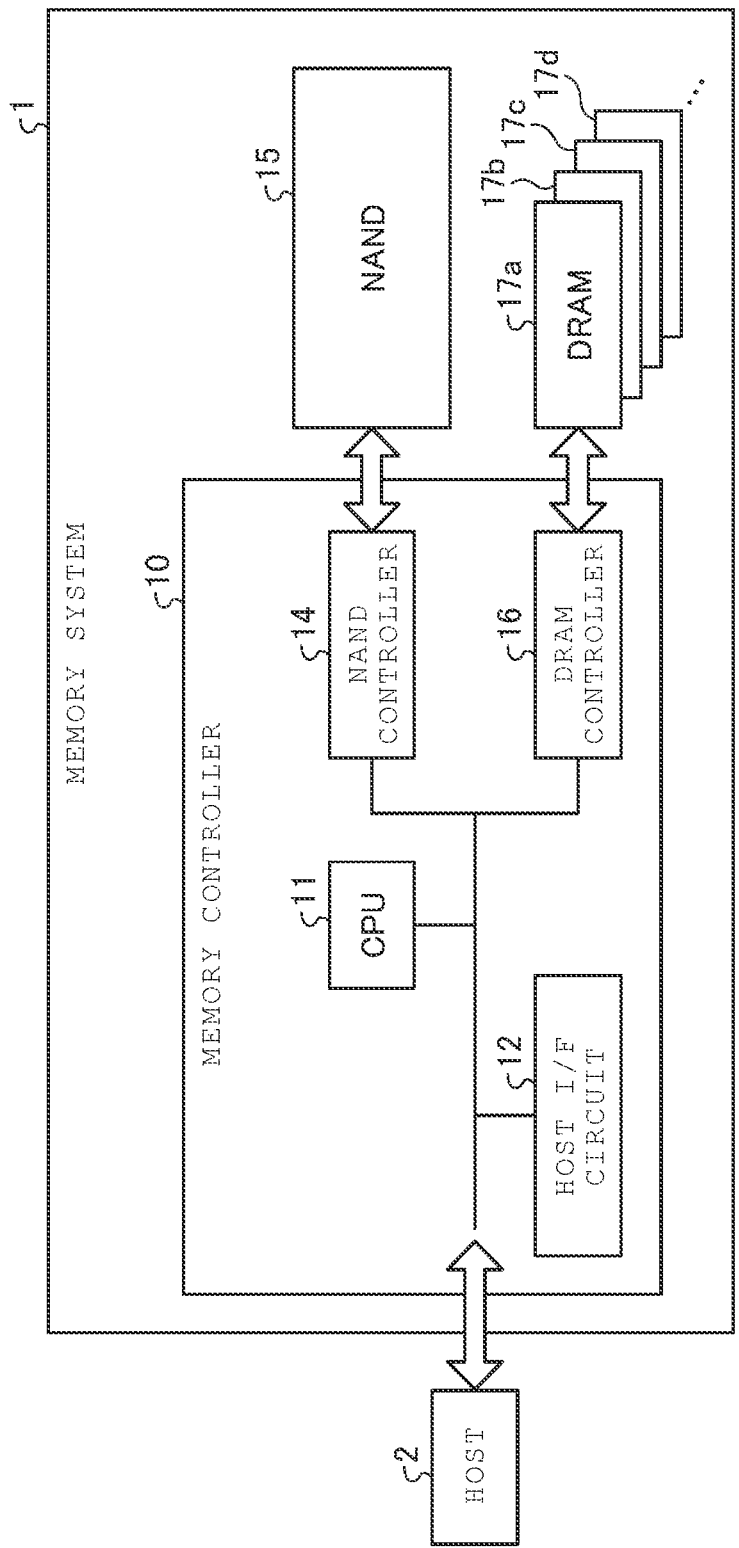
FIG. 1 is a diagram illustrating an example of a configuration of a memory system related to a first embodiment.

FIG. 1 is a diagram illustrating an example of a configuration of a memory system 1 related to at least one embodiment. As illustrated in FIG. 1, the memory system 1 includes a memory controller 10, a NAND-type flash memory 15 (hereinafter, referred to as a "NAND 15"), and a plurality of dynamic random access memories (DRAM) 17.

The memory controller 10 is, for example, configured with a system on a chip (SoC). The memory controller 10 is configured with a field programmable gate array (FPGA) or an application specific integrated circuit (ASIC). The memory controller 10 instructs various operations to the NAND 15 and the DRAMs 17. The memory controller 10 executes an operation based on a request from an external host 2 and an operation regardless of a request from the host 2. Each function of the memory controller 10 may be implemented by a central processing unit (CPU) that executes a program and may be implemented by dedicated hardware.

The memory controller 10 includes a CPU 11, a host interface (I/F) circuit 12, a NAND controller 14, and a DRAM controller 16.

The CPU 11 controls operations of the entire memory controller 10. The CPU 11 issues, for example, a read command in response to a read request received from the host 2 and transmits the issued read command to the NAND controller 14.

The host I/F circuit 12 is connected to the host 2 and controls communication between the memory system 1 and the host 2. The host I/F circuit 12 controls, for example, the transmission of data, requests, and addresses between the memory system 1 and the host 2. The host I/F circuit 12 performs a process according to the communication interface standard with the host 2. The communication interface standard between the host I/F circuit 12 and the host 2 is not limited to a specific standard.

The NAND controller 14 is an interface device for accessing the NAND 15. The NAND controller 14 executes the transmission of information including user data to the NAND 15 under the control by the CPU 11. The NAND controller 14 can perform an error correction process with respect to the user data.

The NAND 15 is a nonvolatile storage medium. The NAND 15 is configured with one or more chips.

The DRAM controller 16 is connected to the plurality of DRAMs 17 and controls communication between the memory controller 10 and a DRAM 17. The plurality of DRAMs 17 include the DRAMs 17a to 17d. The DRAM controller 16 is configured based on the DRAM interface standard.

The DRAM 17 is a volatile storage medium used as a work area of the CPU 11. The DRAM 17 is configured with one or more chips. For example, parameter for managing the NAND 15 and various management tables are stored in the DRAM 17. The DRAM 17 includes, for example, a queue (command queue) of requests received from the host 2. The DRAM 17 stores an address conversion table for converting a logical address associated with data stored in the NAND 15 into a physical address of the NAND 15. This address conversion table is stored, for example, in the NAND 15, is read when the memory system 1 starts up, and stored in the DRAM 17. In addition, the DRAM 17 may be used as a buffer of transmission data between the host 2 and the NAND 15.

As described above, the memory system 1 includes the plurality of DRAMs 17.

First Embodiment

The memory system 1 according to a first embodiment includes the plurality of DRAMs 17 having different capacities, and the DRAM controller 16 controls the plurality of DRAMs 17.

Figure 2:
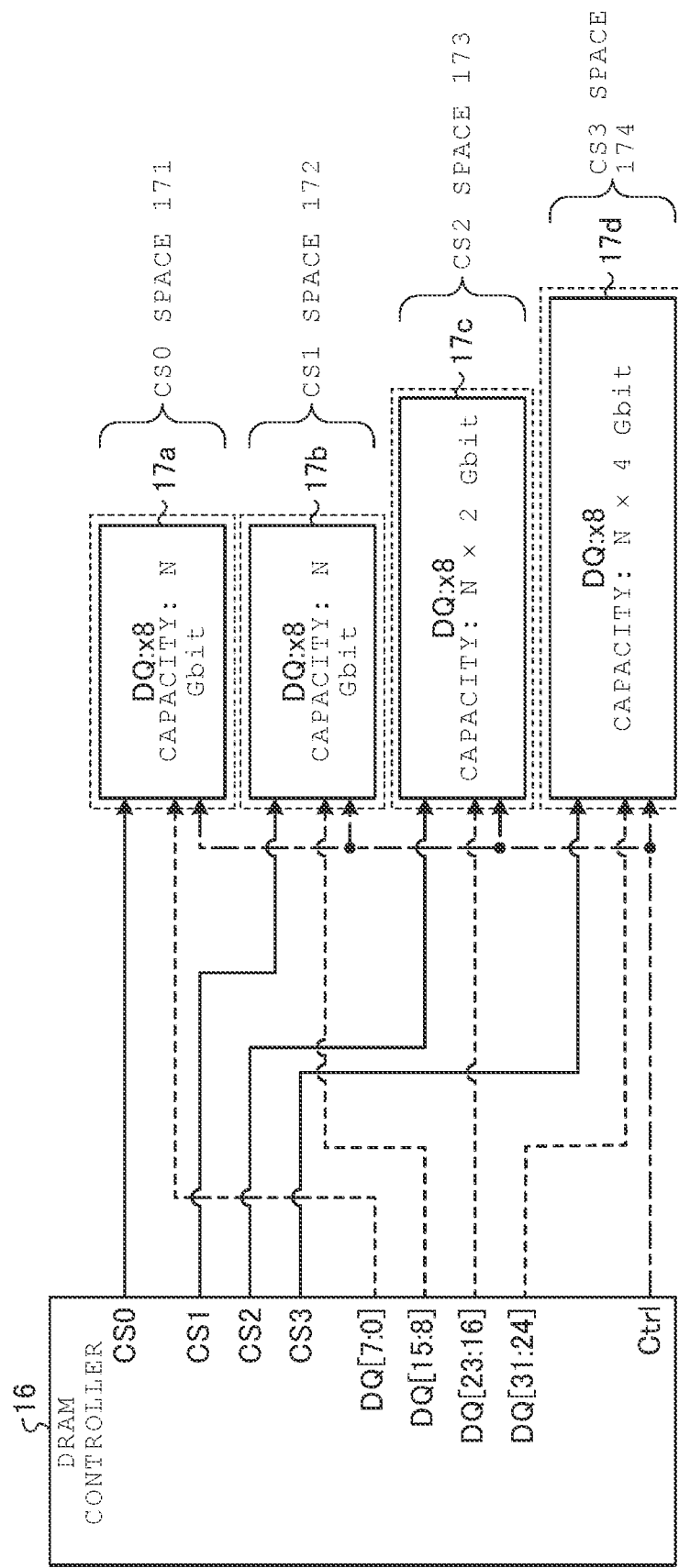
FIG. 2 is a diagram illustrating a connection between a DRAM controller and a DRAM related to the first embodiment.

First, a connection example between the DRAM controller 16 and the DRAMs 17 related to the first embodiment is described with reference to FIG. 2. The DRAM controller 16 is connected to the plurality of DRAMs 17 with signal line groups including signal lines DQ. The signal lines DQ (hereinafter, referred to as DQ lines) are signal lines for transmitting and receiving read data or write data. The DRAM controller 16 is connected to the DRAMs 17a to 17d each that are accessed with the 8-bit width.

The capacity of each of DRAMs 17a and 17b is N Gbits. The capacity of the DRAM 17c is 2N Gbits. The capacity of the DRAM 17d is 4N Gbits. N is any integer. N is, for example, 4.

The DRAM 17a is connected to the DRAM controller 16 via a signal line of a chip select signal CS0. The DRAM 17b is connected to the DRAM controller 16 via a signal line of a chip select signal CS1. The DRAM 17c is connected to the DRAM controller 16 via a signal line of a chip select signal CS2. The DRAM 17d is connected to the DRAM controller 16 via a signal line of a chip select signal CS3. A chip select signal is a signal indicating which DRAM 17 is selected and accessed by the DRAM controller 16.

DQ[7:0] is a signal line with an 8-bit width and is connected from the DRAM controller 16 to the DRAM 17a. DQ[15:8] is a signal line with an 8-bit width and is connected from the DRAM controller 16 to the DRAM 17b. DQ[23:16] is a signal line with an 8-bit width and is connected from the DRAM controller 16 to the DRAM 17c. DQ[31:24] which is a signal line with an 8-bit width is connected from the DRAM controller 16 to the DRAM 17d. In this manner, the DRAM controller 16 and the DRAMs 17a to 17d each of which is accessed with 8-bit units are connected via DQ lines [31:0] with 32-bit widths.

The DRAM controller 16 outputs an access command via a control signal line that is commonly connected to the DRAMs 17a to 17d.

When the chip select signal CS0 is asserted, the DRAM 17a connected to the DRAM controller 16 via a DQ line of an 8-bit width is selected. Therefore, the DRAM controller 16 can access to the DRAM 17a with an 8-bit width. The DRAM controller 16 allocates an address space of the number of bits corresponding to the storage capacity of the DRAM 17a to a storage area of the DRAM 17a. The address space allocated to the storage area of the DRAM 17a is referred to as a CS0 space 171. The address of the CS0 space 171 has an 8-bit width as a unit. That is, one address in the CS0 space 171 collectively designates data with an 8-bit width.

When the chip select signal CS1 is asserted, the DRAM 17b connected to the DRAM controller 16 via an 8-bit DQ line is selected. Accordingly, the DRAM controller 16 can access to the DRAM 17b with an 8-bit width. The DRAM controller 16 allocates an address space of the number of bits corresponding to a storage capacity of the DRAM 17b to the storage area of the DRAM 17b. The address space allocated to the storage area of the DRAM 17b is referred to as a CS1 space 172. The address of the CS1 space 172 has an 8-bit width as a unit. That is, one address in the CS1 space 172 collectively designates data with an 8-bit width.

When the chip select signal CS2 is asserted, the DRAM 17c connected to the DRAM controller 16 via an 8-bit DQ line is selected. Accordingly, the DRAM controller 16 can access the DRAM 17c with an 8-bit width. The DRAM controller 16 allocates an address space of the number of bits corresponding to the storage capacity of the DRAM 17c to a storage area of the DRAM 17c. The address space allocated to the storage area of the DRAM 17c is referred to as a CS2 space 173. The address of the CS2 space 173 has an 8-bit width as a unit. That is, one address in the CS2 space 173 collectively designates data with an 8-bit width.

When the chip select signal CS3 is asserted, the DRAM 17d connected to the DRAM controller 16 via an 8-bit DQ line is selected. Accordingly, the DRAM controller 16 can access to the DRAM 17d with an 8-bit width. The DRAM controller 16 allocates an address space of the number of bits corresponding to the storage capacity of the DRAM 17d to a storage area of the DRAM 17d. The address space allocated to the storage area of the DRAM 17d is referred to as a CS3 space 174. The address of the CS3 space 174 has an 8-bit width as a unit. That is, one address in the CS3 space 174 collectively designates data with an 8-bit width.

The CS0 space 171 corresponding to the chip select signal CS0 is an address space allocated to the DRAM 17a. The CS1 space 172 corresponding to the chip select signal CS1 is an address space allocated to the DRAM 17b. The CS2 space 173 corresponding to the chip select signal CS2 is an address space allocated to the DRAM 17c. The CS3 space 174 corresponding to the chip select signal CS3 is an address space allocated to the DRAM 17d.

The capacity of the CS0 space 171 and the capacity of the CS1 space 172 are the same. The capacity of the CS0 space 171, the capacity of the CS2 space 173, and the capacity of the CS3 space 174 are different from each other. The capacity of the CS1 space 172, the capacity of the CS2 space 173, and the capacity of the CS3 space 174 are different from each other.

Figure 3:
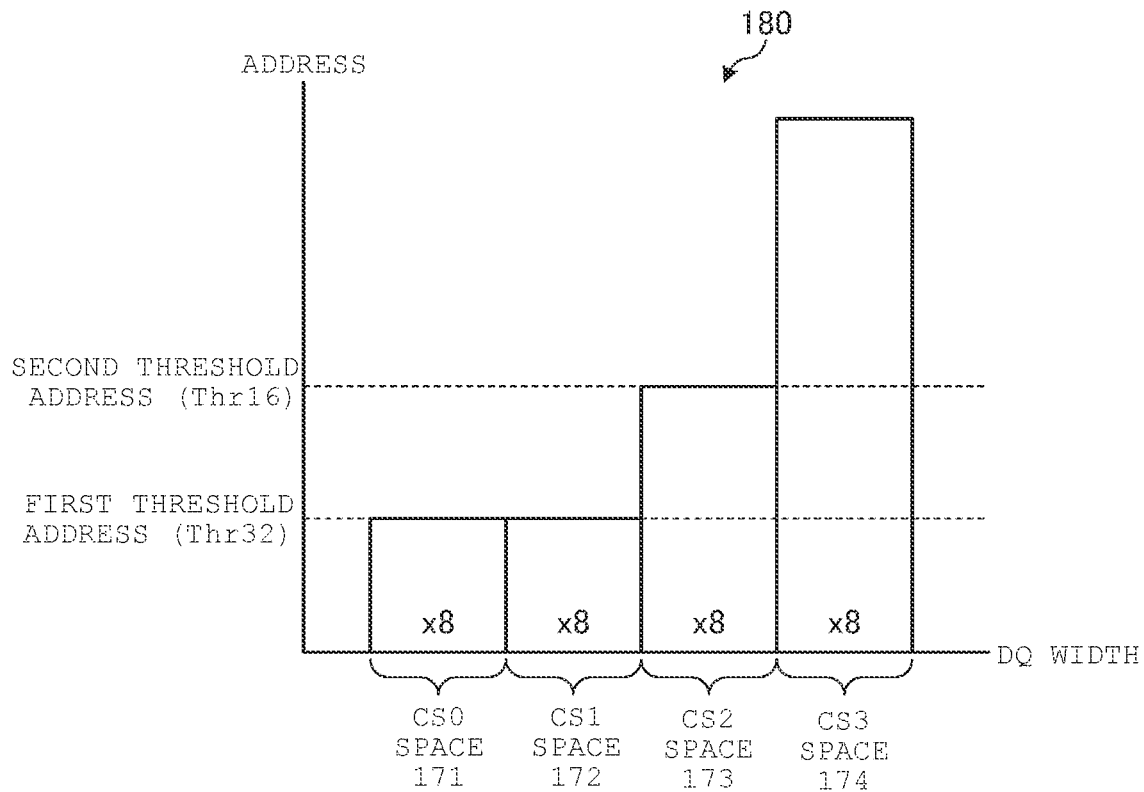
FIG. 3 is a diagram illustrating an address space related to the first embodiment.

Subsequently, an example of an address space related to the first embodiment is illustrated in FIG. 3. FIG. 3 is a diagram illustrating an integrated address space 180 obtained by integrating the CS0 space 171 to the CS3 space 174. The vertical axis indicates an address in the integrated address space 180, and the horizontal axis indicates the bit width of the DQ line (DQ width) in the integrated address space 180. The CS0 space 171 to the CS3 space 174 are located side by side in the DQ width direction in the integrated address space 180. The address of the integrated address space 180 has a 32-bit width as a unit. That is, one address in the integrated address space 180 collectively designates data with a 32-bit width.

The first threshold address is an address of the integrated address space 180 corresponding to the capacity of the DRAM 17a or the DRAM 17b. The second threshold address is an address of the integrated address space 180 corresponding to the capacity of the DRAM 17c. The DRAM controller 16 acquires respective capacities of the DRAMs 17a to 17d from the CPU 11, for example, at the timing when the memory system 1 starts up. The first and second threshold addresses are used when the DRAM controller 16 calculates an address of any one of the CS0 space 171 to the CS3 space 174 from the addresses indicating positions in the integrated address space 180. The first and second threshold addresses are also used when the DRAM controller 16 generates chip select signals.

Since the DRAM controller 16 with the DQ line of the 32-bit width is controlled, the CPU 11 uses an address having a unit of 32-bit access. The DRAM controller 16 calculates addresses of the CS0 space 171 to the CS3 space 174 based on the integrated address space 180 illustrated in FIG. 3. An input address input from the CPU 11 is set as an input address in the integrated address space 180, the first threshold address is set as Thr32, and the second threshold address is set as Thr16. The DRAM controller 16 calculates respective addresses of the CS0 space 171 to the CS3 space 174 based on the input addresses as below.

The DRAM controller 16 calculates the addresses of the CS0 space 171 and the CS1 space 172 by Expression (1-1-1) below.

Address of CS0 Space 171=Address of CS1 Space 172=Input Address in Integrated Address Space 180    Expression (1-1-1)

When the input address in the integrated address space 180 is Thr32 or smaller, the DRAM controller 16 calculates the address of the CS2 space 173 by Expression (1-2-1) below.

Address of CS2 Space 173=Input Address in Integrated Address Space 180    Expression (1-2-1)

When the input address in the integrated address space 180 is larger than Thr32 and Thr16 or smaller, the DRAM controller 16 calculates the address of the CS2 space 173 by Expression (1-2-2) below.

Address of CS2 Space 173=(Input Address in Integrated Address Space 180−Thr32)×2+Thr32    Expression (1-2-2)

When the input address in the integrated address space 180 is Thr32 or smaller, the DRAM controller 16 calculates the address of the CS3 space 174 by Expression (1-3-1) below.

Address of CS3 Space 174=Input Address in Integrated Address Space 180    Expression (1-3-1)

When the input address in the integrated address space 180 is larger than Thr32 and Thr16 or smaller, the DRAM controller 16 calculates the address of the CS3 space 174 by Expression (1-3-2) below.

Address of CS3 Space 174=(Input Address in Integrated Address Space 180−Thr32)×2+Thr32    Expression (1-3-2)

When the input address in the integrated address space 180 is larger than Thr16, the DRAM controller 16 calculates the address of the CS3 space 174 by Expression (1-3-3) below.

Address of CS3 Space 174=(Input Address in Integrated Address Space 180−Thr16)×4+Thr16    Expression (1-3-3)

In addition, the DRAM controller 16 determines which of Expressions (1-1-1) to (1-3-3) is to be used, for example, based on a value of an upper bit of the input address in the integrated address space 180.

When accessing the DRAM 17, the DRAM controller 16 generates a chip select signal based on the input address in the integrated address space 180 and a threshold address illustrated in FIG. 3. For example, the DRAM controller 16 generates a chip select signal in the following method.

When the input address in the integrated address space 180 is Thr32 or smaller, the DRAM controller 16 generates the chip select signals CS0, CS1, CS2, and CS3.

When the input address in the integrated address space 180 is larger than Thr32 and Thr16 or smaller, the DRAM controller 16 does not generate the chip select signal CS0 or CS1 and generates the chip select signals CS2 and CS3.

When the input address in the integrated address space 180 is larger than Thr16, the DRAM controller 16 does not generate the chip select signal CS0, CS1, or CS2 and generates the chip select signal CS3. That is, the DRAM controller 16 always generates the chip select signal CS3 regardless of the input address in the integrated address space 180.

In such a configuration, when the input address in the integrated address space 180 is Thr32 or smaller, the CS0 space 171, the CS1 space 172, the CS2 space 173, and the CS3 space 174 are selected, and the DRAM controller 16 accesses the DRAM 17 via a DQ line of the 32-bit width. When the input address in the integrated address space 180 is larger than Thr32 and Thr16 or smaller, the CS2 space 173 and the CS3 space 174 are selected, the DRAM controller 16 accesses the DRAM 17 via a DQ line of the 16-bit width. When the input address in the integrated address space 180 is larger than Thr16 and smaller than the maximum address, the CS3 space 174 is selected, the DRAM controller 16 accesses the DRAM 17 via a DQ line of the 8-bit width.

The DRAM controller 16 controls the DRAM 17 based on a command input from the CPU 11, an address calculated by Expressions (1-1-1) to (1-3-3), and a chip select signal, so that a command process in any one of the DRAMs 17a to 17d is executed. When the DRAM controller 16 generates the chip select signals CS0 to CS3, command processes in the DRAMs 17 (that is, the DRAMs 17a to 17d) of the CS0 space 171 to the CS3 space 174 are executed. When the DRAM controller 16 does not generate the chip select signals CS0 to CS1 and generates the chip select signals CS2 to CS3, command processes in the DRAMs 17 (that is, the DRAMs 17c to 17d) of the CS2 space 173 to the CS3 space 174 are executed. When the DRAM controller 16 does not generate the chip select signals CS0 to CS2 and generates the chip select signal CS3, a command process in the DRAM 17 (that is, the DRAM 17d) of the CS3 space 174 is executed.

Figure 4:
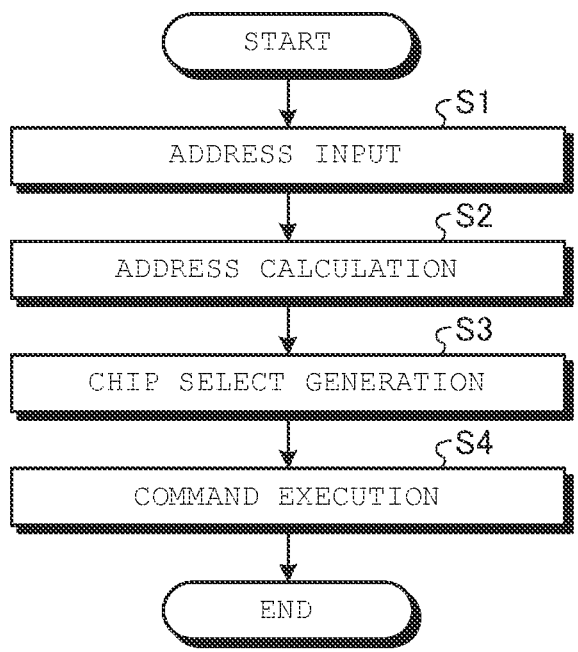
FIG. 4 is a flowchart illustrating a process procedure of a memory controller related to the first embodiment.

Subsequently, a process procedure of controlling an access to the plurality of DRAMs 17 by the DRAM controller 16 is described by using a flowchart illustrated in FIG. 4. The DRAM controller 16 receives, for example, an input of an address from the CPU 11 (Step S1). Subsequently, the DRAM controller 16 calculates an address of an access destination based on an input address in the integrated address space 180 and a threshold address (Step S2). The DRAM controller 16 generates a chip select signal based on the input address in the integrated address space 180 and the threshold address (Step S3). Also, the DRAM controller 16 outputs the address calculated in Step S2, the chip select signal, and a command signal and causes the DRAM 17 to execute a command (Step S4).

In the memory system 1 related to the first embodiment, DQ lines of 8-bit widths are connected to the plurality of DRAMs 17, respectively. The CS0 space 171 to the CS3 space 174 are allocated to the plurality of DRAMs 17a to 17d, respectively. Addresses to be access destinations are generated based on the integrated address space 180 obtained by integrating the CS0 space 171 to the CS3 space 174 and the input addresses in the integrated address space 180.

In addition, the memory system 1 generates addresses to be access destinations based on the first or second threshold address. By calculating addresses using these threshold addresses and Expressions (1-1-1) to (1-3-3) above, the memory system 1 can calculate the addresses in a plurality of address spaces that are accessed by access unit of different bit widths.

In addition, the memory system 1 can select the DRAM 17 to be an access destination by generating a chip select signal based on the first or second threshold address.

Here, a memory system of a comparative example is described. A DRAM controller of the memory system according to the comparative example corresponds only to a DQ line of the 32-bit width. Also, a plurality of DRAMs accessed with an 8-bit width and having the capacity of N Gbits are mounted in the memory system according to the comparative example. For the memory system according to the comparative example having this configuration, even when the capacity of the mounted DRAM is insufficient, for example, by 2N Gbits, four DRAMs (that is, 4N Gbits) have to be additionally mounted.

In the memory system 1 of the present embodiment, the plurality of DRAMs 17 accessed with an 8-bit width and having different capacities and the DRAM controller 16 are connected. The address spaces accessed by the 32-bit width, the 16-bit width, and the 8-bit width are allocated to each DRAM 17. Accordingly, DRAMs with various capacities can be mounted on the memory system. For example, when the capacity of the mounted DRAM 17 is insufficient by 2N Gbits, the capacities of the DRAMs 17 (that is, the DRAMs 17a and 17b) corresponding to the CS0 space 171 and the CS1 space 172 each may be set to be larger by 1N Gbits. In other words, the capacity of the DRAM 17 corresponding to the CS2 space 173 (that is, the DRAM 17c) may be larger by 2N Gbits.

Accordingly, with respect to the memory system 1 according to at least one embodiment, the DRAMs of the shortage amount can be mounted without excessively increasing the number of the DRAMs. Accordingly, it is possible to decrease the cost of the memory system while allocating the necessary capacity of the DRAMs.

Second Embodiment

According to the first embodiment, DQ lines of 8-bit widths are respectively connected to the plurality of DRAMs with different capacities, but a memory system according to a second embodiment includes DRAMs with the same capacities, and DQ lines of bit widths in accordance with allocated address spaces are connected to the DRAMs. The DRAM controller 16 controls the plurality of DRAMs 17.

Figure 5:
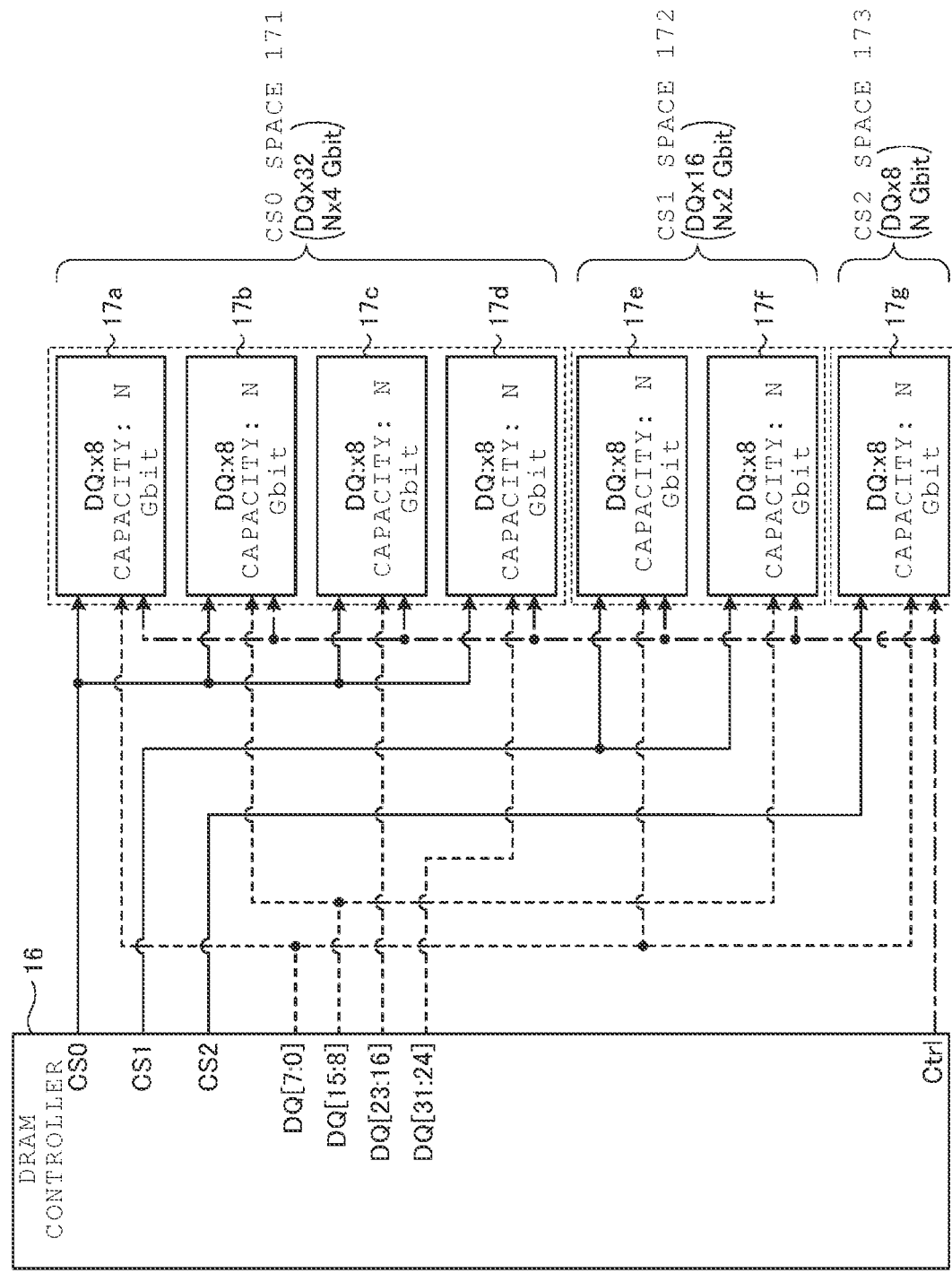
FIG. 5 is a diagram illustrating a connection between a DRAM controller and a DRAM related to a second embodiment.

FIG. 5 is a diagram illustrating a connection example between the DRAM controller 16 and the DRAMs 17 related to the second embodiment. The DRAM controller 16 is connected to the plurality of DRAMs 17 via a signal line groups including the signal lines DQ. Specifically, the DRAM controller 16 is connected to the DRAMs 17a to 17g. The DRAMs 17a to 17g are respectively accessed by 8-bit widths and each have the capacity of N Gbits.

The DRAMs 17a to 17d are connected to the DRAM controller 16 via the signal line of the chip select signal CS0. The DRAMs 17e and 17f are connected to the DRAM controller 16 via the signal line of the chip select signal CS1. The DRAM 17g is connected to the DRAM controller 16 via the signal line of the chip select signal CS2.

DQ[7:0] that is a signal line with an 8-bit width is connected from the DRAM controller 16 to the DRAM 17a. The DQ[7:0] that is the signal line with an 8-bit width is connected from the DRAM controller 16 also to the DRAM 17e. The DQ[7:0] that is the signal line with an 8-bit width is connected from the DRAM controller 16 also to the DRAM 17g.

DQ[15:8] that is the signal line with an 8-bit width is connected from the DRAM controller 16 to the DRAM 17b. The DQ[15:8] that is the signal line with an 8-bit width is connected from the DRAM controller 16 also to the DRAM 17f. DQ[23:16] that is the signal line with an 8-bit width is connected from the DRAM controller 16 to the DRAM 17c. DQ[31:24] that is the signal line with an 8-bit width is connected from the DRAM controller 16 to the DRAM 17d. In this manner, the DRAMs 17a to 17g that are respectively accessed with 8-bit units and the DRAM controller 16 are connected by the DQ lines [31:0] of the 32-bit width.

The DRAM controller 16 outputs an access command via a control signal line commonly connected to the DRAMs 17a to 17g.

When the chip select signal CS0 is asserted, the DRAMs 17a to 17d connected to the DRAM controller 16 via DQ lines each with an 8-bit width are collectively selected. Accordingly, the DRAM controller 16 can access to the DRAMs 17a to 17d with 32-bit widths. That is, the DRAMs 17a to 17d cooperatively provide a storage area of a 32-bit access. The DRAM controller 16 allocates address spaces having units of the 32-bit access to the storage areas of the DRAMs 17a to 17d. The address spaces allocated to the storage areas of the DRAMs 17a to 17d are referred to as the CS0 space 171. The address of the CS0 space 171 has a 32-bit width as a unit. That is, one address in the CS0 space 171 collectively designates data with a 32-bit width.

When the chip select signal CS1 is asserted, the DRAMs 17e and 17f connected to the DRAM controller 16 via DQ lines each with an 8-bit width are collectively selected. Accordingly, the DRAM controller 16 can access to the DRAMs 17e and 17f with 16-bit widths. That is, the DRAMs 17e and 17f cooperatively provide a storage area of a 16-bit access. The DRAM controller 16 allocates address spaces having units of the 16-bit access to the storage areas of the DRAMs 17e and 17f. The address spaces allocated to the storage areas of the DRAMs 17e and 17f are referred to as the CS1 space 172. The address of the CS1 space 172 has a 16-bit width as a unit. That is, one address in the CS1 space 172 collectively designates data with a 16-bit width.

When the chip select signal CS2 is asserted, the DRAM 17g connected to the DRAM controller 16 via a DQ line of an 8-bit width is selected. Accordingly, the DRAM controller 16 can access to the DRAM 17g with an 8-bit width. That is, the DRAM 17g provides a storage area of an 8-bit access. The DRAM controller 16 allocates address spaces having units of the 8-bit access to the storage area of the DRAM 17g. The address space allocated to the storage area of the DRAM 17g is referred to as the CS2 space 173. The address of the CS2 space 173 has an 8-bit width as a unit. That is, one address in the CS2 space 173 collectively designates data with an 8-bit width.

The CS0 space 171 corresponding to the chip select signal CS0 is an address space allocated to the DRAMs 17a to 17d. The DRAMs 17 corresponding to the CS0 space 171 (the DRAMs 17a to 17d) are accessed with 32-bit widths and each have the capacity of N×4 Gbits. The CS1 space 172 corresponding to the chip select signal CS1 is an address space allocated to the DRAMs 17e and 17f. The DRAMs 17 corresponding to the CS1 space 172 (the DRAMs 17e and 17f) are accessed with 16-bit widths and each have the capacity of N×2 Gbits. The CS2 space 173 corresponding to the chip select signal CS2 is an address space allocated to the DRAM 17g. The DRAM 17 corresponding to the CS2 space 173 (the DRAM 17g) is accessed with an 8-bit width and has the capacity of N Gbits.

Figure 6:
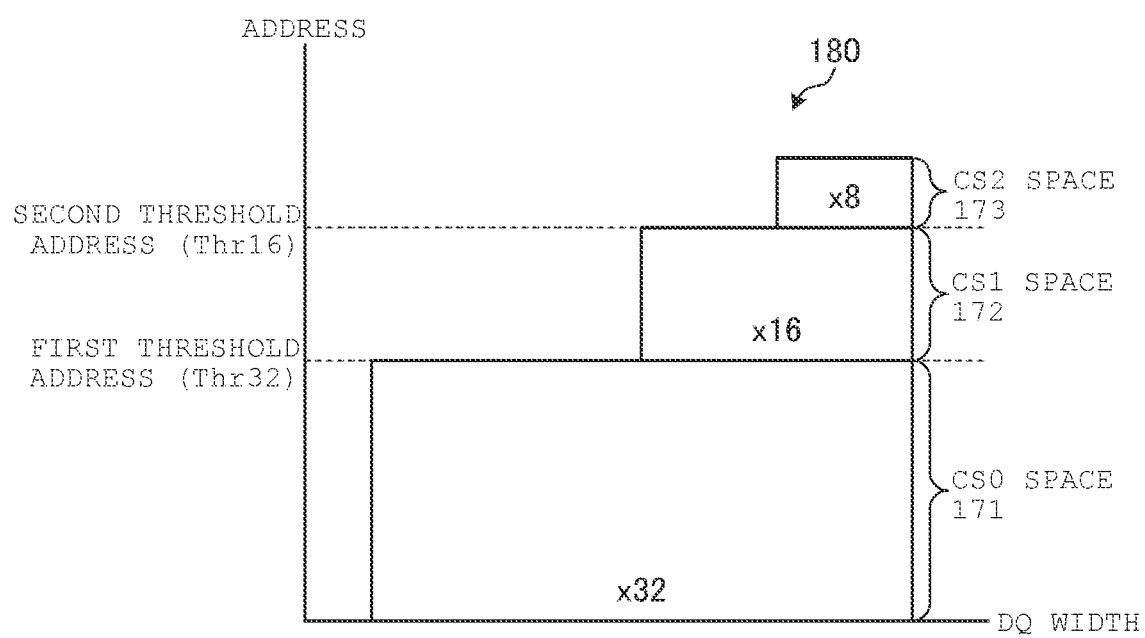
FIG. 6 is a diagram illustrating an address space related to the second embodiment.

Here, an example of the integrated address space 180 obtained by integrating the CS0 space 171 to the CS2 space 173 is illustrated in FIG. 6. The vertical axis is an address in the integrated address space 180, and the horizontal axis indicates the bit width of the DQ line (DQ width) in the integrated address space 180. The CS1 space 172 is positioned on the CS0 space 171. The CS2 space 173 is positioned on the CS1 space 172. The address in the integrated address space 180 has a 32-bit width as a unit. That is, one address in the integrated address space 180 collectively designates data with a 32-bit width.

The first threshold address is an address of the integrated address space 180 corresponding to the capacities of the DRAMs 17a to 17d. The second threshold address is an address of the integrated address space 180 corresponding to the capacities of the DRAMs 17a to 17f.

The DRAM controller 16 calculates an address of the access destination by using the integrated address space 180 obtained by integrating the CS0 space 171 to the CS2 space 173. The first and second threshold addresses are used when the DRAM controller 16 calculates an address of any one of the CS0 space 171 to the CS2 space 173 from the addresses indicating positions in the integrated address space 180. The first and second threshold addresses are also used when the DRAM controller 16 generates chip select signals.

Since the DRAM controller 16 with the DQ line of the 32-bit width is controlled, the CPU 11 uses an address having a unit of 32-bit access. The DRAM controller 16 calculates addresses of the CS0 space 171 to the CS2 space 173 based on the integrated address space 180 illustrated in FIG. 6. The input address input from the CPU 11 is set as an input address in the integrated address space 180, the first threshold address is set as Thr32, and the second threshold address is set as Thr16. The DRAM controller 16 calculates respective addresses of the CS0 space 171 to the CS2 space 173 based on the input addresses as below.

The DRAM controller 16 calculates an address of the CS0 space 171 by Expression (2-1-1) below.

Address of CS0 Space 171=Input Address in Integrated Address Space 180     Expression (2-1-1)

The DRAM controller 16 calculates an address of the CS1 space 172 by Expression (2-2-1) below.

Address of CS1 Space 172=(Input Address in Integrated Address Space 180−Thr-32)×2+Thr32     Expression (2-2-1)

The DRAM controller 16 calculates an address of the CS2 space 173 by Expression (2-3-1) below.

Address of CS2 space 173=(Input Address in Integrated Address Space 180−Thr-16)×4+Thr16     Expression (2-3-1)

In addition, the DRAM controller 16 determines which of Expressions (2-1-1) to (2-3-1) is to be used, for example, based on a value of an upper bit of the input address in the integrated address space 180.

When accessing to the DRAM 17, the DRAM controller 16 generates a chip select signal based on the input address in the integrated address space 180 and the threshold address illustrated in FIG. 6. For example, the DRAM controller 16 generates a chip select signal in the following method.

When the input address in the integrated address space 180 is Thr32 or smaller, the DRAM controller 16 generates the chip select signal CS0.

When the input address in the integrated address space 180 is larger than Thr32 and Thr16 or smaller, the DRAM controller 16 generates the chip select signal CS1.

When the input address in the integrated address space 180 is larger than Thr16, the DRAM controller 16 generates the chip select signal CS2.

In such a configuration, when the input address in the integrated address space 180 is Thr32 or smaller, the CS0 space 171 is selected, and the DRAM controller 16 accesses the DRAM 17 via a DQ line of the 32-bit width. When the input address in the integrated address space 180 is larger than Thr32 and Thr16 or smaller, the CS1 space 172 is selected, and the DRAM controller 16 accesses the DRAM 17 via a DQ line of the 16-bit width. When the input address in the integrated address space 180 is larger than Thr16 and smaller than the maximum address, the CS2 space 173 is selected, and the DRAM controller 16 accesses the DRAM 17 via a DQ line of the 8-bit width.

The DRAM controller 16 controls the DRAM 17 based on a command input from the CPU 11, an address calculated by Expressions (2-1-1) to (2-3-1), and a chip select signal, so that a command process in any one of the DRAMs 17a to 17g is executed. When the DRAM controller 16 generates the chip select signal CS0, command processes in the DRAMs 17 (that is, the DRAMs 17a to 17d) of the CS0 space 171 are executed. When the DRAM controller 16 generates the chip select signal CS1, command processes in the DRAMs 17 (that is, the DRAMs 17e and 17f) of the CS1 space 172 are executed. When the DRAM controller 16 generates the chip select signal CS2, a command process in the DRAM 17 (that is, the DRAM 17g) of the CS2 space 173 is executed.

In the memory system 1 related to the second embodiment, DQ lines of 8-bit widths are connected to the DRAMs 17a to 17g, respectively. The CS0 space 171 with the 32-bit access is allocated to the DRAMs 17a to 17d, the CS1 space 172 with the 16-bit access is allocated to the DRAMs 17e and 17f, and the CS2 space 173 with the 8-bit access is allocated to the DRAM 17g. The addresses to be the access destinations are generated based on the integrated address space 180 and the input addresses in the integrated address space 180.

In addition, the memory system 1 generates addresses to be access destinations based on the first or second threshold address. The memory system 1 can calculate the addresses in a plurality of address spaces that are accessed by access unit of different bit widths by calculating addresses by using these threshold addresses and Expressions (2-1-1) to (2-3-1) above.

In addition, the memory system 1 allocates the integrated address space 180 so that the minimum address of the CS1 space 172 is larger than the maximum address of the CS0 space 171. Accordingly, the memory system 1 can simply and easily calculate the addresses as shown in Expression (2-2-1).

In addition, the memory system 1 allocates the integrated address space 180 so that the minimum address of the CS2 space 173 is larger than the maximum address of the CS1 space 172. Accordingly, the memory system 1 can simply and easily calculate the addresses as shown in Expression (2-3-1).

In addition, the memory system 1 can select the DRAM 17 to be the access destination by generating a chip select signal based on the first or second threshold address.

Here, a memory system of a comparative example is described. A DRAM controller of the memory system according to the comparative example corresponds only to a DQ line of the 32-bit width. Also, a plurality of DRAMs accessed with an 8-bit width and having the same capacities are mounted in the memory system according to the comparative example. With respect to the memory system according to the comparative example having the configuration, even when the capacity of the DRAM that only requires a band of the 8-bit access band or smaller is insufficient, four DRAMs (that is, 32-bit access) are additionally mounted.

In the memory system 1 of at least one embodiment, the plurality of DRAMs 17 accessed with an 8-bit width and having the same capacities and the DRAM controller 16 are connected. The address spaces accessed by the 32-bit width, the 16-bit width, and the 8-bit width are allocated to each DRAM 17. Accordingly, when the capacity of the DRAM that only requires a band of the 8-bit access band or smaller is insufficient, only one DRAM can be additionally mounted.

Accordingly, with respect to the memory system 1 according to at least one embodiment, the DRAMs of the shortage amount can be mounted without excessively increasing the number of the DRAMs. Accordingly, it is possible to decrease the cost of the memory system while allocating the necessary capacity of the DRAMs.

Third Embodiment

A memory system according to a third embodiment includes the DRAMs 17 in a dual die package (DDP). The DRAM 17 in the DDP includes two DRAM chips in the package. One chip select signal line is connected to one DRAM chip.

Figure 7:
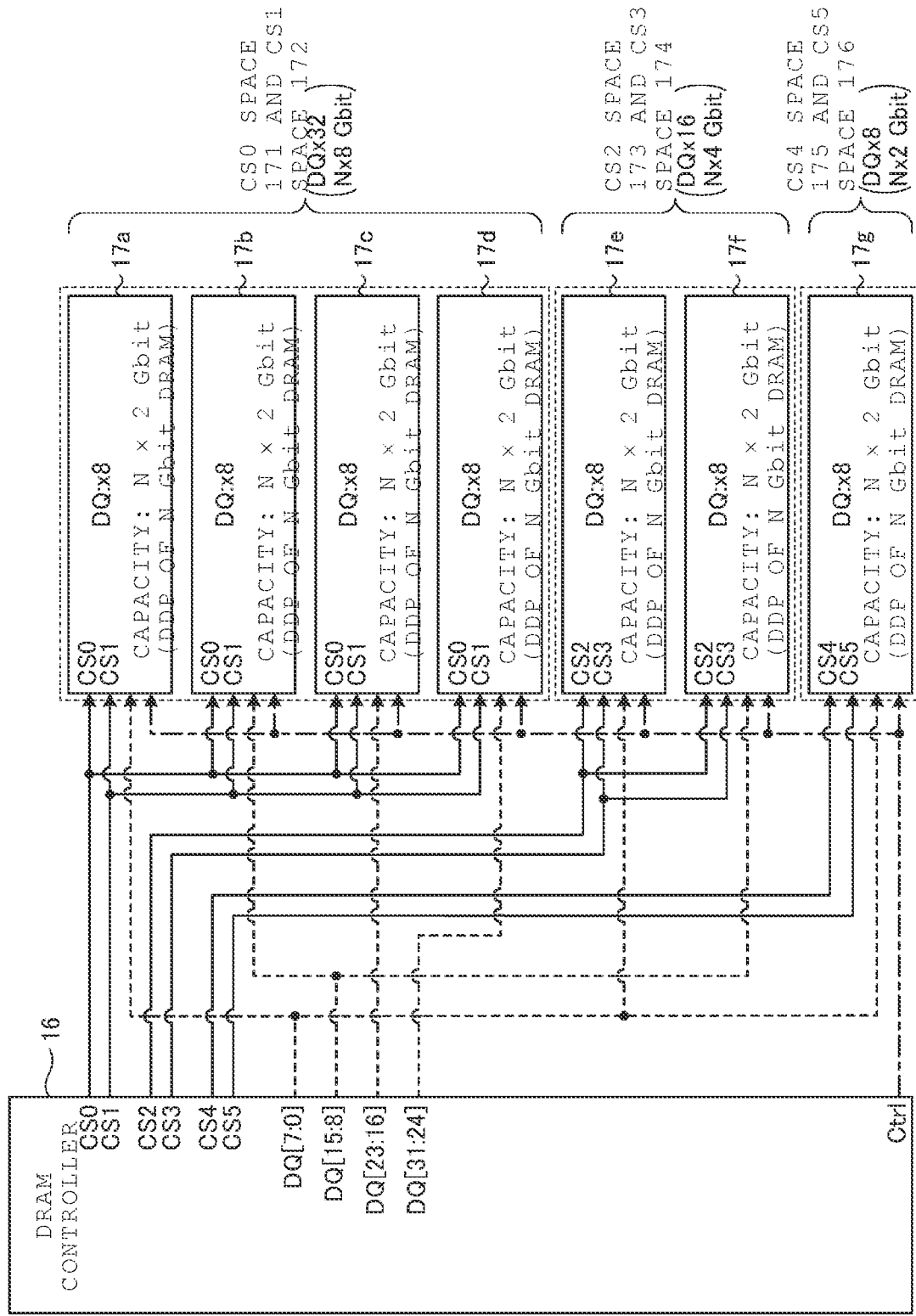
FIG. 7 is a diagram illustrating a connection between a DRAM controller and a DRAM related to a third embodiment.

FIG. 7 is a diagram illustrating the connection example between the DRAM controller 16 and the DRAMs 17 related to the third embodiment. In at least one embodiment, the plurality of DRAMs 17 having the same capacities are mounted to the memory system 1. Differences from FIG. 5 are mainly described.

The signal line of the chip select signal CS0 is connected from the DRAM controller 16 to the DRAM chip 17*a*-1 among two DRAM chips 17*a*-1 and 17*a*-2 (not illustrated) in the DRAM 17*a*. The signal line of the chip select signal CS1 is connected to the DRAM chip 17*a*-2. In the same manner, the signal lines of the chip select signal CS0 and the chip select signal CS1 are connected from the DRAM controller 16 to the DRAMs 17*b* to 17*d*.

The signal line of the chip select signal CS2 is connected from the DRAM controller 16 to the DRAM chip 17*e*-1 among two DRAM chips 17*e*-1 and 17*e*-2 (not illustrated) in the DRAM 17*e*. The signal line of the chip select signal CS3 is connected to the DRAM chip 17*e*-2. In the same manner, the signal lines of the chip select signal CS2 and the chip select signal CS3 are connected from the DRAM controller 16 to the DRAM 17*f*.

A signal line of a chip select signal CS4 is connected from the DRAM controller 16 to the DRAM chip 17*g*-1 among two DRAM chips 17*g*-1 and 17*g*-2 (not illustrated) in the DRAM 17*g*. The signal line of a chip select signal CS5 is connected to the DRAM chip 17*g*-2.

The capacity of each of the DRAM chip 17*a*-1 to the DRAM chip 17*g*-2 is N Gbits. That is, the capacity of each of the DRAMs 17*a* to 17*g* is N Gbits×2.

DQ[7:0] that is a signal line with an 8-bit width is connected from the DRAM controller 16 to the DRAM 17*a*. The DQ[7:0] that is the signal line with an 8-bit width is connected from the DRAM controller 16 also to the DRAM 17*e*. The DQ[7:0] that is the signal line with an 8-bit width is connected from the DRAM controller 16 also to the DRAM 17*g*.

DQ[15:8] that is the signal line with an 8-bit width is connected from the DRAM controller 16 to the DRAM 17*b*. The DQ[15:8] that is the signal line with an 8-bit width is connected from the DRAM controller 16 to the DRAM 17*f*. DQ[23:16] that is the signal line with an 8-bit width is connected from the DRAM controller 16 to the DRAM 17*c*. DQ[31:24] that is the signal line with an 8-bit width is connected from the DRAM controller 16 to the DRAM 17*d*. In this manner, the DRAM controller 16 and the DRAMs 17*a* to 17*g* each of which is accessed with 8-bit units are connected via DQ lines [31:0] with 32-bit widths.

The DRAM controller 16 outputs an access command via a control signal line commonly connected to the DRAMs 17*a* to 17*g*.

When the chip select signal CS0 is asserted, the DRAM chips 17*a*-1 to 17*d*-1 connected to the DRAM controller 16 via DQ lines each with an 8-bit width are collectively selected. Accordingly, the DRAM controller 16 can access to the DRAM chips 17*a*-1 to 17*d*-1 with 32-bit widths. That is, the DRAM chips 17*a*-1 to 17*d*-1 cooperatively provide a storage area of a 32-bit access. The DRAM controller 16 allocates address spaces having units of the 32-bit access to the storage areas of the DRAM chips 17*a*-1 to 17*d*-1. The address spaces allocated to the storage areas of the DRAM chips 17*a*-1 to 17*d*-1 are referred to as the CS0 space 171. The address of the CS0 space 171 has a 32-bit width as a unit. That is, one address in the CS0 space 171 collectively designates data with a 32-bit width.

When the chip select signal CS1 is asserted, the DRAM chips 17*a*-2 to 17*d*-2 connected to the DRAM controller 16 via DQ lines each with an 8-bit width are collectively selected. Accordingly, the DRAM controller 16 can access to the DRAM chips 17*a*-2 to 17*d*-2 with 32-bit widths. That is, the DRAM chips 17*a*-2 to 17*d*-2 cooperatively provide a storage area of a 32-bit access. The DRAM controller 16 allocates address spaces having units of the 32-bit access to the storage areas of the DRAM chips 17*a*-2 to 17*d*-2. The address spaces allocated to the storage areas of the DRAM chips 17*a*-2 to 17*d*-2 are referred to as the CS1 space 172. The address of the CS1 space 172 has a 32-bit width as a unit. That is, one address in the CS1 space 172 collectively designates data with a 32-bit width.

When the chip select signal CS2 is asserted, the DRAM chips 17*e*-1 and 17*f*-1 connected to the DRAM controller 16 via DQ lines each with an 8-bit width are collectively selected. Accordingly, the DRAM controller 16 can access to the DRAM chips 17*e*-1 and 17*f*-1 with 16-bit widths. That is, the DRAM chips 17*e*-1 and 17*f*-1 cooperatively provide a storage area of a 16-bit access. The DRAM controller 16 allocates address spaces having units of the 16-bit access to the storage areas of the DRAM chips 17*e*-1 and 17*f*-1. The address spaces allocated to the storage areas of the DRAM chips 17*e*-1 and 17*f*-1 are referred to as the CS2 space 173. The address of the CS2 space 173 has a 16-bit width as a unit. That is, one address in the CS2 space 173 collectively designates data with a 16-bit width.

When the chip select signal CS3 is asserted, the DRAM chips 17*e*-2 and 17*f*-2 connected to the DRAM controller 16 via DQ lines each with an 8-bit width are collectively selected. Accordingly, the DRAM controller 16 can access to the DRAM chips 17*e*-2 and 17*f*-2 with 16-bit widths. That is, the DRAM chips 17*e*-2 and 17*f*-2 cooperatively provide a storage area of a 16-bit access. The DRAM controller 16 allocates address spaces having units of the 16-bit access to the storage areas of the DRAM chips 17e-2 and 17f-2. The address spaces allocated to the storage areas of the DRAM chips 17e-2 and 17f-2 are referred to as the CS3 space 174. The address of the CS3 space 174 has a 16-bit width as a unit. That is, one address in the CS3 space 174 collectively designates data with a 16-bit width.

When the chip select signal CS4 is asserted, the DRAM chip 17g-1 connected to the DRAM controller 16 via a DQ line of an 8-bit width is selected. Accordingly, the DRAM controller 16 can access to the DRAM chip 17g-1 with an 8-bit width. That is, the DRAM chip 17g-1 provides a storage area of an 8-bit access. The DRAM controller 16 allocates address spaces having units of the 8-bit access to the storage area of the DRAM chip 17g-1. The address space allocated to the storage area of the DRAM chip 17g-1 is referred to as a CS4 space 175. The address of the CS4 space 175 has an 8-bit width as a unit. That is, one address in the CS4 space 175 collectively designates data with an 8-bit width.

When the chip select signal CS5 is asserted, the DRAM chip 17g-2 connected to the DRAM controller 16 via a DQ line of an 8-bit width is selected. Accordingly, the DRAM controller 16 can access to the DRAM chip 17g-2 with an 8-bit width. That is, the DRAM chip 17g-2 provides a storage area of an 8-bit access. The DRAM controller 16 allocates address spaces having units of the 8-bit access to the storage area of the DRAM chip 17g-2. The address space allocated to the storage area of the DRAM chip 17g-2 is referred to as a CS5 space 176. The address of the CS5 space 176 has an 8-bit width as a unit. That is, one address in the CS5 space 176 collectively designates data with an 8-bit width.

The CS0 space 171 corresponding to the chip select signal CS0 is an address space allocated to the DRAM chips 17a-1 to 17d-1. The DRAMs 17 corresponding to the CS0 space 171 (the DRAM chips 17a-1 to 17d-1) are accessed with 32-bit widths and each have the capacity of N×4 Gbits. The CS1 space 172 corresponding to the chip select signal CS1 is an address space allocated to the DRAM chips 17a-2 to 17d-2. The DRAMs 17 corresponding to the CS1 space 172 (the DRAM chips 17a-2 to 17d-2) are accessed with 32-bit widths and each have the capacity of N×4 Gbits. The CS2 space 173 corresponding to the chip select signal CS2 is an address space allocated to the DRAM chips 17e-1 and 17f-1. The DRAMs 17 corresponding to the CS2 space 173 (the DRAM chips 17e-1 and 17f-1) are accessed with 16-bit widths and each have the capacity of N×2 Gbits. The CS3 space 174 corresponding to the chip select signal CS3 is an address space allocated to the DRAM chips 17e-2 and 17f-2. The DRAMs 17 corresponding to the CS3 space 174 (the DRAM chips 17e-2 and 17f-2) are accessed with 16-bit widths and each have the capacity of N×2 Gbits. The CS4 space 175 corresponding to the chip select signal CS4 is an address space allocated to the DRAM chip 17g-1. The DRAM 17 corresponding to the CS4 space 175 (the DRAM chip 17g-1) is accessed with an 8-bit width and has the capacity of N Gbits. The CS5 space 176 corresponding to the chip select signal CS5 is an address space allocated to the DRAM chip 17g-2. The DRAM 17 corresponding to the CS5 space 176 (the DRAM chip 17g-2) is accessed by an 8-bit width and has the capacity of N Gbits.

Figure 8:
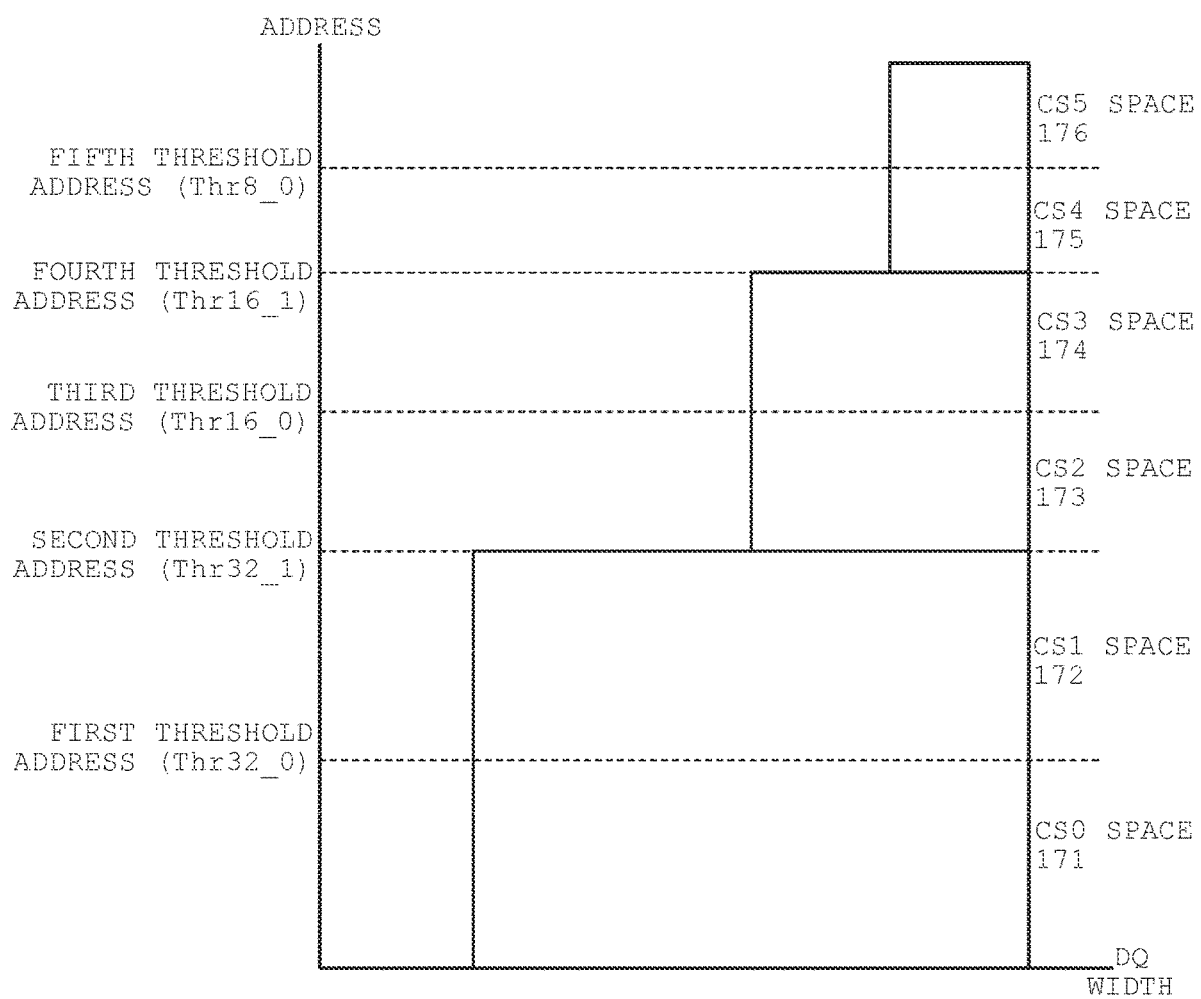
FIG. 8 is a diagram illustrating an address space related to the third embodiment.

Here, an example of the integrated address space 180 obtained by integrating the CS0 space 171 to the CS5 space 176 is illustrated in FIG. 8. The vertical axis indicates an address in the integrated address space 180, and the horizontal axis indicates the bit width of the DQ line (DQ width) in the integrated address space 180. The CS1 space 172 is positioned on the CS0 space 171. The CS2 space 173 is positioned on the CS1 space 172. The CS3 space 174 is positioned on the CS2 space 173. The CS4 space 175 is positioned on the CS3 space 174. The CS5 space 176 is positioned on the CS4 space 175. The address of the integrated address space 180 has a 32-bit width as a unit. That is, one address in the integrated address space 180 collectively designates data with a 32-bit width.

The first threshold address is an address of the integrated address space 180 corresponding to the capacities of the DRAM chips 17a-1 to 17d-1. The second threshold address is an address of the integrated address space 180 corresponding to the capacities of the DRAM chips 17a-1 to 17d-2. A third threshold address is an address of the integrated address space 180 corresponding to the capacities of the DRAM chips 17a-1 to 17f-1. A fourth threshold address is an address of the integrated address space 180 corresponding to the capacities of the DRAM chips 17a-1 to 17f-2. A fifth threshold address is an address of the integrated address space 180 corresponding to the capacities of the DRAM chips 17a-1 to 17g-1.

The DRAM controller 16 calculates an address of the access destination by using the integrated address space 180 obtained by integrating the CS0 space 171 to the CS5 space 176. The first to fifth threshold addresses are used when the DRAM controller 16 calculates an address of any one of the CS0 space 171 to the CS5 space 176 from the addresses indicating positions in the integrated address space 180. The first to fifth threshold addresses are also used when the DRAM controller 16 generates chip select signals.

Since the DRAM controller 16 with the DQ line of the 32-bit width is controlled, the CPU 11 uses an address having a unit of 32-bit access. The DRAM controller 16 calculates addresses of the CS0 space 171 to the CS5 space 176 based on the integrated address space 180 illustrated in FIG. 8. The input address input from the CPU 11 is set as an input address in the integrated address space 180, the first threshold address is set as $Thr32\_0$, the second threshold address is set as $Thr32\_1$, the third threshold address is set as $Thr16\_0$, the fourth threshold address is set as $Thr16\_1$, and the fifth threshold address is set as $Thr8\_0$. The DRAM controller 16 calculates respective addresses of the CS0 space 171 to the CS5 space 176 based on the input addresses by Expression below.

The DRAM controller 16 calculates an address of the CS0 space 171 by Expression (3-1-1) below.

Address of CS0 Space 171=Input Address in Integrated Address Space 180     Expression (3-1-1)

The DRAM controller 16 calculates an address of the CS1 space 172 by Expression (3-1-2) below.

Address of CS1 Space 172=Input Address in Integrated Address Space 180−Thr32_0     Expression (3-1-2)

The DRAM controller 16 calculates an address of the CS2 space 173 by Expression (3-2-1) below.

Address of CS2 Space 173=(Input Address in Integrated Address Space 180−Thr32_1)×2+Thr32_1     Expression (3-2-1)

The DRAM controller 16 calculates an address of the CS3 space 174 by Expression (3-2-2) below.

Address of CS3 Space 174=(Input Address in Integrated Address Space 180−Thr16_0)×2+Thr16_0     Expression (3-2-2)

The DRAM controller 16 calculates an address of the CS4 space 175 by Expression (3-3-1) below.

Address of CS4 Space 175=(Input Address in Integrated Address Space 180−Thr16_1)×4+Thr16_1     Expression (3-3-1)

The DRAM controller 16 calculates an address of the CS5 space 176 by Expression (3-3-2) below.

Address of CS5 Space 176=(Input Address in Integrated Address Space 180−Thr8_0)×4+Thr8_0   Expression (3-3-2)

In addition, the DRAM controller 16 determines which of Expressions (3-1-1) to (3-3-2) is to be used, for example, based on a value of an upper bit of an input address in the integrated address space 180.

When accessing to the DRAM 17, the DRAM controller 16 generates a chip select signal based on an input address in the integrated address space 180 and a threshold address illustrated in FIG. 8. For example, the DRAM controller 16 generates a chip select signal in the following method.

When the input address in the integrated address space 180 is Thr32_0 or smaller, the DRAM controller 16 generates the chip select signal CS0.

When the input address in the integrated address space 180 is larger than Thr32_0 and Thr32_1 or smaller, the DRAM controller 16 generates the chip select signal CS1.

When the input address in the integrated address space 180 is larger than Thr32_1 and Thr16_0 or smaller, the DRAM controller 16 generates the chip select signal CS2.

When the input address in the integrated address space 180 is larger than Thr16_0 and Thr16_1 or smaller, the DRAM controller 16 generates the chip select signal CS3.

When the input address in the integrated address space 180 is larger than Thr16_1 and Thr8_0 or smaller, the DRAM controller 16 generates the chip select signal CS4.

When the input address in the integrated address space 180 is larger than Thr8_0, the DRAM controller 16 generates the chip select signal CS5.

In the memory system 1 related to the third embodiment, DQ lines of 8-bit widths are connected to the plurality of DRAMs 17, respectively. The CS0 space 171 to the CS5 space 176 are allocated to the plurality of DRAM chip 17*a*-1 to the DRAM chip 17*g*-2. The addresses to be the access destinations are generated based on the integrated address space 180 obtained by integrating the CS0 space 171 to the CS5 space 176 and the input addresses in the integrated address space 180.

Here, a memory system of a comparative example is described. A DRAM controller of the memory system according to the comparative example corresponds only to a DQ line of the 32-bit width. Also, a plurality of DRAMs in the DDP accessed with an 8-bit width and having the same capacities are mounted in the memory system according to the comparative example. With respect to the memory system according to the comparative example having the configuration, even when the capacity of the DRAM that only requires a band of the 8-bit access band or smaller is insufficient, four DRAMs (that is, 32-bit access) in the DDP have to be additionally mounted.

In the memory system 1 of at least one embodiment, the plurality of DRAMs 17 in the DDP accessed with an 8-bit width and having the same capacities and the DRAM controller 16 are connected. The address spaces accessed by the 32-bit width, the 16-bit width, and the 8-bit width are allocated to each DRAM 17. Accordingly, when the capacity of the DRAM that only requires a band of the 8-bit access band or smaller is insufficient, only one DRAM in the DDP can be additionally mounted.

Accordingly, with respect to the memory system 1 according to the embodiment in which the DRAMs in the DDP are mounted, the DRAMs of the shortage amount can be mounted without excessively increasing the number of the DRAMs. Accordingly, it is possible to decrease the cost of the memory system while allocating the necessary capacity of the DRAMs.

Fourth Embodiment

A memory system according to a fourth embodiment includes the plurality of DRAMs 17 in the DDP having the same bit width of the DQ line and different capacities.

Figure 9:
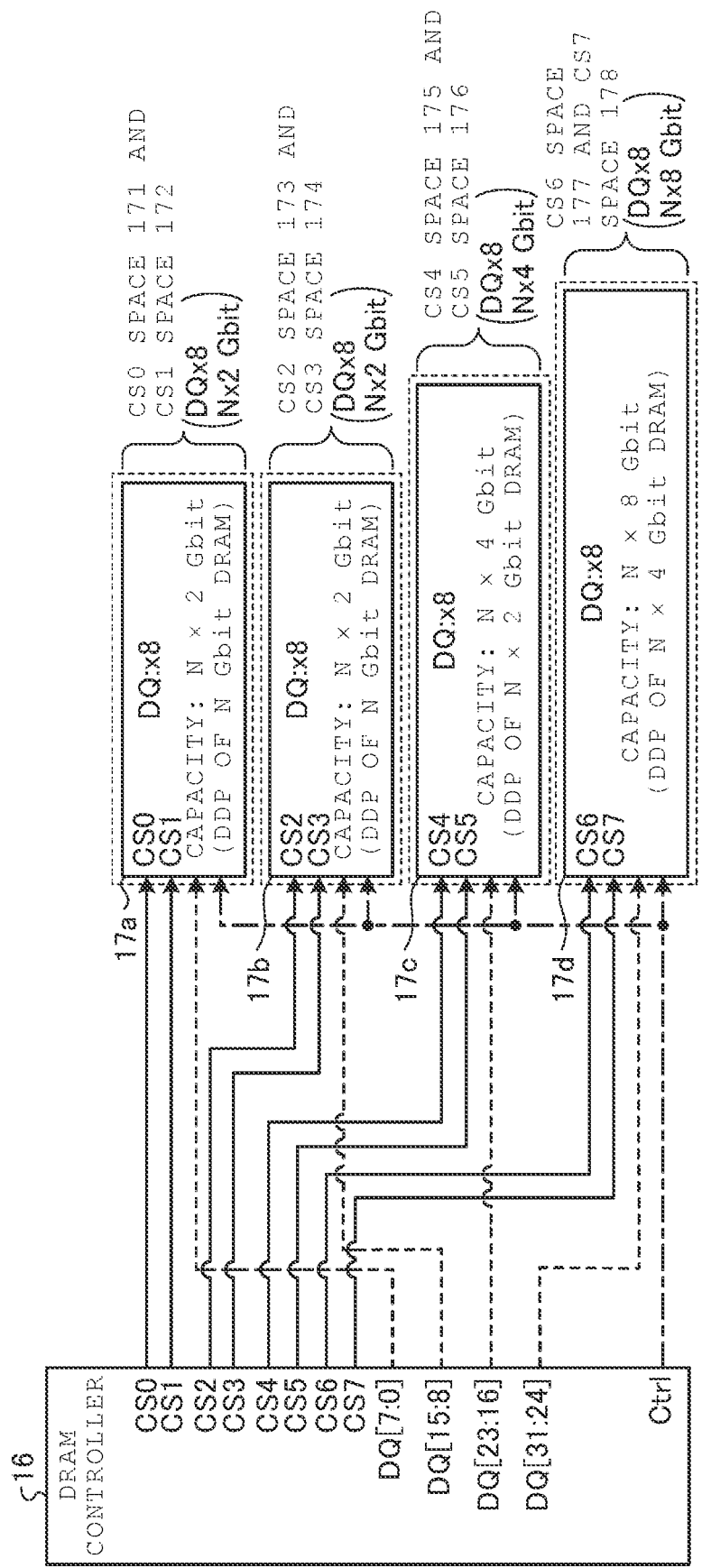
FIG. 9 is a diagram illustrating a connection between a DRAM controller and a DRAM related to a fourth embodiment.

FIG. 9 is a diagram illustrating a connection example between the DRAM controller 16 and the DRAMs 17 related to the fourth embodiment. According to at least one embodiment, the plurality of DRAMs 17 having the same bit width of the DQ line and different capacities are mounted on the memory system 1. Differences from FIG. 2 are mainly described.

The signal line of the chip select signal CS0 is connected from the DRAM controller 16 to the DRAM chip 17*a*-1 among the two DRAM chips 17*a*-1 and 17*a*-2 (not illustrated) in the DRAM 17*a*. The signal line of the chip select signal CS1 is connected to the DRAM chip 17*a*-2.

The signal line of the chip select signal CS2 is connected from the DRAM controller 16 to the DRAM chip 17*b*-1 among two DRAM chips 17*b*-1 and 17*b*-2 (not illustrated) in the DRAM 17*b*. The signal line of the chip select signal CS3 is connected to the DRAM chip 17*b*-2.

The signal line of the chip select signal CS4 is connected from the DRAM controller 16 to the DRAM chip 17*c*-1 among two DRAM chips 17*c*-1 and 17*c*-2 (not illustrated) in the DRAM 17*c*. The signal line of the chip select signal CS5 is connected to the DRAM chip 17*c*-2.

A signal line of a chip select signal CS6 is connected from the DRAM controller 16 to the DRAM chip 17*d*-1 among two DRAM chips 17*d*-1 and 17*d*-2 (not illustrated) in the DRAM 17*d*. A signal line of a chip select signal CS7 is connected to the DRAM chip 17*d*-2.

The capacity of each of the DRAM chips 17*a*-1 to 17*b*-2 is N Gbits. That is, the capacity of each of the DRAMs 17*a* and 17*b* is N Gbits×2. The capacities of each of the DRAM chips 17*c*-1 and 17*c*-2 is 2N Gbits. That is, the capacity of the DRAM 17*c* is 2N Gbits×2. The capacities of each of the DRAM chips 17*d*-1 and 17*d*-2 is 4N Gbits. That is, the capacity of the DRAM 17*d* is 4N Gbits×2.

DQ[7:0] that is the signal line with an 8-bit width is connected from the DRAM controller 16 to the DRAM 17*a*. DQ[15:8] that is the signal line with an 8-bit width is connected from the DRAM controller 16 to the DRAM 17*b*. DQ[23:16] that is the signal line with an 8-bit width is connected from the DRAM controller 16 to the DRAM 17*c*. DQ[31:24] that is the signal line with an 8-bit width is connected from the DRAM controller 16 to the DRAM 17*d*. In this manner, the DRAM controller 16 and the DRAMs 17*a* to 17*d* each of which is accessed with 8-bit units are connected via DQ lines [31:0] with 32-bit widths.

The DRAM controller 16 outputs an access command via a control signal line commonly connected to the DRAMs 17*a* to 17*d*.

When the chip select signal CS0 is asserted, the DRAM chip 17*a*-1 connected to the DRAM controller 16 via a DQ line of an 8-bit width is selected. Accordingly, the DRAM controller 16 can access to the DRAM chip 17*a*-1 with an 8-bit width. The DRAM controller 16 allocates an address space of the number of bits corresponding to the storage capacity of the DRAM chip 17*a*-1 to the storage area of the DRAM chip 17*a*-1. The address space allocated to the storage area of the DRAM chip 17*a*-1 is referred to as the CS0 space 171. The address of the CS0 space 171 has an 8-bit width as a unit. That is, one address in the CS0 space 171 collectively designates data with an 8-bit width.

When the chip select signal CS1 is asserted, the DRAM chip 17*a*-2 connected to the DRAM controller 16 via a DQ line of an 8-bit width is selected. Accordingly, the DRAM controller 16 can access to the DRAM chip 17*a*-2 with an 8-bit width. The DRAM controller 16 allocates an address space of the number of bits corresponding to the storage capacity of the DRAM chip 17*a*-2 to the storage area of the DRAM chip 17*a*-2. The address space allocated to the storage area of the DRAM chip 17*a*-2 is referred to as the CS1 space 172. The address of the CS1 space 172 has an 8-bit width as a unit. That is, one address in the CS1 space 172 collectively designates data with an 8-bit width.

When the chip select signal CS2 is asserted, the DRAM chip 17*b*-1 connected to the DRAM controller 16 via a DQ line of an 8-bit width is selected. Accordingly, the DRAM controller 16 can access to the DRAM chip 17*b*-1 with an 8-bit width. The DRAM controller 16 allocates an address space of the number of bits corresponding to the storage capacity of the DRAM chip 17*b*-1 to the storage area of the DRAM chip 17*b*-1. The address space allocated to the storage area of the DRAM chip 17*b*-1 is referred to as the CS2 space 173. The address of the CS2 space 173 has an 8-bit width as a unit. That is, one address in the CS2 space 173 collectively designates data with an 8-bit width.

When the chip select signal CS3 is asserted, the DRAM chip 17*b*-2 connected to the DRAM controller 16 via a DQ line of an 8-bit width is selected. Accordingly, the DRAM controller 16 can access to the DRAM chip 17*b*-2 with an 8-bit width. The DRAM controller 16 allocates an address space of the number of bits corresponding to the storage capacity of the DRAM chip 17*b*-2 to the storage area of the DRAM chip 17*b*-2. The address space allocated to the storage area of the DRAM chip 17*b*-2 is referred to as the CS3 space 174. The address of the CS3 space 174 has an 8-bit width as a unit. That is, one address in the CS3 space 174 collectively designates data with an 8-bit width.

When the chip select signal CS4 is asserted, the DRAM chip 17*c*-1 connected to the DRAM controller 16 via a DQ line of an 8-bit width is selected. Accordingly, the DRAM controller 16 can access to the DRAM chip 17*c*-1 with an 8-bit width. The DRAM controller 16 allocates an address space of the number of bits corresponding to the storage capacity of the DRAM chip 17*c*-1 to the storage area of the DRAM chip 17*c*-1. The address space allocated to the storage area of the DRAM chip 17*c*-1 is referred to as the CS4 space 175. The address of the CS4 space 175 has an 8-bit width as a unit. That is, one address in the CS4 space 175 collectively designates data with an 8-bit width.

When the chip select signal CS5 is asserted, the DRAM chip 17*c*-2 connected to the DRAM controller 16 via a DQ line of an 8-bit width is selected. Accordingly, the DRAM controller 16 can access to the DRAM chip 17*c*-2 with an 8-bit width. The DRAM controller 16 allocates an address space of the number of bits corresponding to the storage capacity of the DRAM chip 17*c*-2 to the storage area of the DRAM chip 17*c*-2. The address space allocated to the storage area of the DRAM chip 17*c*-2 is referred to as the CS5 space 176. The address of the CS5 space 176 has an 8-bit width as a unit. That is, one address in the CS5 space 176 collectively designates data with an 8-bit width.

When the chip select signal CS6 is asserted, the DRAM chip 17*d*-1 connected to the DRAM controller 16 via a DQ line of an 8-bit width is selected. Accordingly, the DRAM controller 16 can access to the DRAM chip 17*d*-1 with an 8-bit width. The DRAM controller 16 allocates an address space of the number of bits corresponding to the storage capacity of the DRAM chip 17*d*-1 to the storage area of the DRAM chip 17*d*-1. The address space allocated to the storage area of the DRAM chip 17*d*-1 is referred to as a CS6 space 177. The address of the CS6 space 177 has an 8-bit width as a unit. That is, one address in the CS6 space 177 collectively designates data with an 8-bit width.

When the chip select signal CS7 is asserted, the DRAM chip 17*d*-2 connected to the DRAM controller 16 via a DQ line of an 8-bit width is selected. Accordingly, the DRAM controller 16 can access to the DRAM chip 17*d*-2 with an 8-bit width. The DRAM controller 16 allocates an address space of the number of bits corresponding to the storage capacity of the DRAM chip 17*d*-2 to the storage area of the DRAM 17*d*-2. The address space allocated to the storage area of the DRAM chip 17*d*-2 is referred to as a CS7 space 178. The address of the CS7 space 178 has an 8-bit width as a unit. That is, one address in the CS7 space 178 collectively designates data with an 8-bit width.

The capacities of the CS0 space 171 to the CS3 space 174 are the same. The capacity of the CS4 space 175 and the capacity of the CS5 space 176 are the same. The capacity of the CS6 space 177 and the capacity of the CS7 space 178 are the same. The capacity of any one of the CS0 space 171 to the CS3 space 174, the capacity of any one of the CS4 space 175 and the CS5 space 176, the capacity of any one of the CS6 space 177 and the CS7 space 178 are different from each other.

Figure 10:
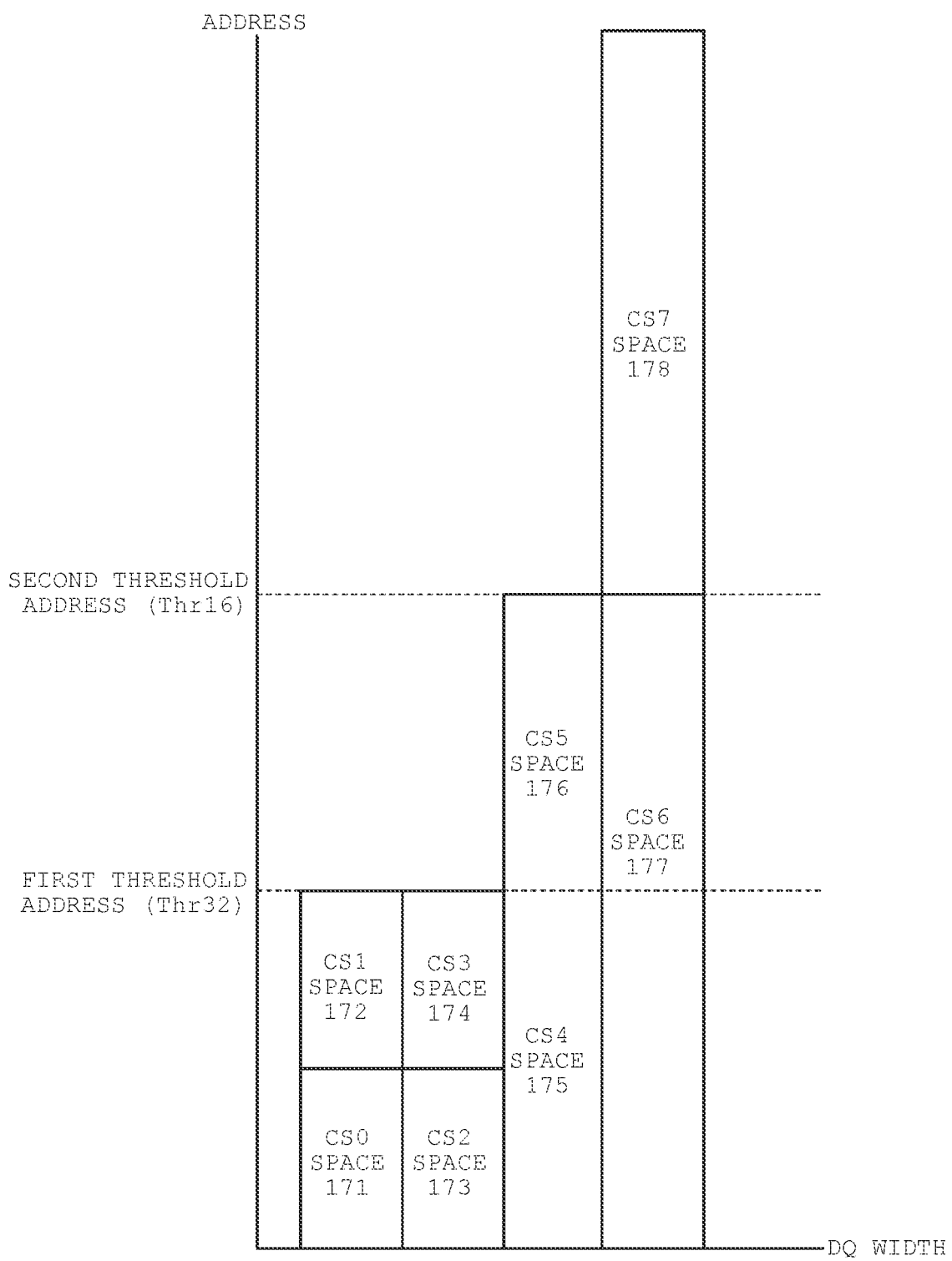
FIG. 10 is a diagram illustrating an address space related to the fourth embodiment.

Subsequently, an example of an address space related to the fourth embodiment is illustrated in FIG. 10. FIG. 10 is a diagram illustrating an integrated address space 180 obtained by integrating the CS0 space 171 to the CS7 space 178. The vertical axis indicates an address in the integrated address space 180, and the horizontal axis indicates the bit width of the DQ line (DQ width) in the integrated address space 180. The CS0 space 171, the CS2 space 173, the CS4 space 175, and the CS6 space 177 are arranged side by side in the DQ width direction of the integrated address space 180. The CS1 space 172 is positioned on the CS0 space 171. The CS3 space 174 is positioned on the CS2 space 173. The CS5 space 176 is positioned on the CS4 space 175. The CS7 space 178 is positioned on the CS6 space 177. The address of the integrated address space 180 has a 32-bit width as a unit. That is, one address in the integrated address space 180 collectively designates data with a 32-bit width.

The first threshold address is an address of the integrated address space 180 corresponding to the capacities of the DRAMs 17*a* to 17*d*. The second threshold address is an address of the integrated address space 180 corresponding to the capacities of the DRAMs 17*a* to 17*f*. The first and second threshold addresses are used when the DRAM controller 16 calculates an address of any one of the CS0 space 171 to the CS7 space 178 from the addresses indicating positions in the integrated address space 180. The first and second threshold addresses are also used when the DRAM controller 16 generates chip select signals.

Since the DRAM controller 16 with the DQ line of the 32-bit width is controlled, the CPU 11 uses an address having a unit of 32-bit access. The DRAM controller 16 calculates addresses of the CS0 space 171 to the CS7 space 178 based on the integrated address space 180 illustrated in FIG. 10. The input address input from the CPU 11 is set as an input address in the integrated address space 180, the first threshold address is set as Thr32, and the second threshold address is set as Thr16. The DRAM controller 16 calculates respective addresses of the CS0 space 171 to the CS7 space 178 based on the input addresses as below.

When the input address in the integrated address space 180 is Thr32 or smaller, the DRAM controller 16 calculates addresses of the CS0 space 171 to the CS3 space 174 by Expression (4-1-1) below.

Address of CS0 Space 171=Address of CS1 Space 172=Address of CS2 Space 173=Address of CS3 Space 174=Input Address in Integrated Address Space 180   Expression (4-1-1)

When the input address in the integrated address space 180 is Thr32 or smaller, the DRAM controller 16 calculates an address of the CS4 space 175 by Expression (4-2-1) below.

Address of CS4 Space 175=Input Address in Integrated Address Space 180   Expression (4-2-1)

When the input address in the integrated address space 180 is larger than Thr32 and Thr16 or smaller, the DRAM controller 16 calculates an address of the CS5 space 176 by Expression (4-2-2) below.

Address of CS5 Space 176=(Input Address in Integrated Address Space 180−Thr32)×2+Thr32   Expression (4-2-2)

When the input address in the integrated address space 180 is Thr32 or smaller, the DRAM controller 16 calculates an address of the CS6 space 177 by Expression (4-3-1) below.

Address of CS6 Space 177=Input Address in Integrated Address Space 180   Expression (4-3-1)

When the input address in the integrated address space 180 is larger than Thr32 and Thr16 or smaller, the DRAM controller 16 calculates an address of the CS6 space 177 by Expression (4-3-2) below.

Address of CS6 Space 177=(Input Address in Integrated Address Space 180−Thr32)×2+Thr32   Expression (4-3-2)

When the input address in the integrated address space 180 is larger than Thr16, the DRAM controller 16 calculates an address of the CS7 space 178 by Expression (4-3-3) below.

Address of CS7 Space 178=(Input Address in Integrated Address Space 180−Thr16)×4+Thr16   Expression (4-3-3)

In addition, the DRAM controller 16 determines which of Expressions (4-1-1) to (4-3-3) is to be used, for example, based on a value of an upper bit of the input address in the integrated address space 180.

When accessing to the DRAM 17, the DRAM controller 16 generates a chip select signal based on an input address in the integrated address space 180 and a threshold address illustrated in FIG. 10. For example, the DRAM controller 16 generates a chip select signal in the following method.

When the input address in the integrated address space 180 is (Thr32/2) or smaller, the DRAM controller 16 generates the chip select signal CS0.

When the input address in the integrated address space 180 is larger than (Thr32/2) and Thr32 or smaller, the DRAM controller 16 generates the chip select signal CS1.

When the input address in the integrated address space 180 is (Thr32/2) or smaller, the DRAM controller 16 generates the chip select signal CS2.

When the input address in the integrated address space 180 is larger than (Thr32/2) and Thr32 or smaller, the DRAM controller 16 generates the chip select signal CS3.

When the input address in the integrated address space 180 is Thr32 or smaller, the DRAM controller 16 generates the chip select signal CS4.

When the input address in the integrated address space 180 is larger than Thr32 and Thr16 or smaller, the DRAM controller 16 generates the chip select signal CS5.

When the input address in the integrated address space 180 is Thr16 or smaller, the DRAM controller 16 generates the chip select signal CS6.

When the input address in the integrated address space 180 is larger than Thr16, the DRAM controller 16 generates the chip select signal CS7.

In the memory system 1 related to the fourth embodiment, DQ lines of 8-bit widths are connected to the plurality of DRAMs 17, respectively. The CS0 space 171 to the CS7 space 178 are allocated to the plurality of DRAM chips 17*a*-1 to 17*d*-2. The addresses to be the access destinations are generated based on the integrated address space 180 obtained by integrating the CS0 space 171 to the CS7 space 178 and the input addresses in the integrated address space 180.

Here, a memory system of a comparative example is described. A DRAM controller of the memory system according to the comparative example corresponds only to a DQ line of the 32-bit width. Also, a plurality of DRAMs accessed with an 8-bit width and each having the capacity of N Gbits are mounted in the memory system according to the comparative example. With respect to the memory system according to the comparative example having the configuration, even when the capacity of the mounted DRAM in the DDP is insufficient, for example, by 2N Gbits, four DRAMs in the DDP (that is, 4N Gbits) have to be additionally mounted.

The memory system 1 of the present embodiment is accessed with an 8-bit width, and the plurality of DRAMs 17 in the DDP with different capacities and the DRAM controller 16 are connected. The address spaces accessed by the 32-bit width, the 16-bit width, and the 8-bit width are allocated to each DRAM 17. Accordingly, DRAMs with various capacities can be mounted on the memory system. For example, when the capacity of the mounted DRAM 17 is insufficient by 2N Gbits, the capacities of the DRAMs 17 in the DDP (that is, the DRAMs 17*a* and 17*b*) corresponding to the CS0 space 171 and the CS2 space 173 each may be set to be larger by 1N Gbits. In other words, the capacity of the DRAM 17 in the DDP corresponding to the CS4 space 175 (that is, the DRAM 17*c*) may be larger by 2N Gbits.

Accordingly, with respect to the memory system 1 according to the embodiment in which the DRAMs in the DDP are mounted, the DRAMs of the shortage amount can be mounted without excessively increasing the number of the DRAMs. Accordingly, it is possible to decrease the cost of the memory system while allocating the necessary capacity of the DRAMs.

In the memory system 1 according to the third and fourth embodiments, DRAMs in the DDP and DRAMs in a Single Die Package (SDP) may be mixed.

In the first to fourth embodiments, it is described that the CPU 11 inputs the input address in the integrated address space 180 to the DRAM controller 16, but the host I/F circuit 12 or the NAND controller 14 may input the input address.

The bit width of the DQ line that is supported by the DRAM controller 16 according to the first to fourth embodiments is not limited to 32 bits, but may be 64 bits or 128 bits. In addition, the bit width with which the DRAM 17 is accessed is not limited to 8 bits.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
a first volatile memory in which data having a first bit width is collectively accessed;
a second volatile memory in which data having the first bit width is collectively accessed, the second volatile memory having a capacity larger than the first volatile memory; and
a controller connected to the first and second volatile memories,
wherein the controller is configured to:
allocate, to the first volatile memory, a first address space in which one address collectively designates data having the first bit width;
allocate, to the second volatile memory, a second address space in which one address collectively designates data having the first bit width;
based on a first address indicating a position in a third address space, the third address space being an address space in which one address collectively designates data having a second bit width different from the first bit width,
select at least one of the first or second volatile memory, and
calculate a second address in the first or second address space allocated to the selected at least one volatile memory; and
access a position corresponding to the second address of the selected at least one volatile memory.

2. The memory system according to claim 1, wherein the controller is configured to calculate the second address based on the first address and a maximum address, the maximum address being an address in the third address space that corresponds to the capacity of the first volatile memory.

3. The memory system according to claim 1, wherein the controller is configured to:
generate a chip select signal of at least one of the first or second volatile memory based on the first address and a maximum address, the maximum address being an address in the third address space that corresponds to the capacity of the first volatile memory, and
access the selected at least one volatile memory using the generated chip select signal.

4. The memory system according to claim 1, wherein each of the first and second volatile memories includes a plurality of memory chips.

5. The memory system according to claim 4, wherein the second bit width is two times as wide as the first bit width, and
the controller is configured to:
when the first address is smaller than a maximum address, the maximum address being an address in the third address space that corresponds to the capacity of the first volatile memory, select both of the first and second volatile memories, and wherein the second address is the same as the first address,
when the first address is larger than the maximum address,
not select the first volatile memory but select the second volatile memory, and
calculate an address obtained by adding the maximum address to an address obtained by doubling a difference between the first address and the maximum address, as the second address.

6. A memory system comprising:
a first volatile memory set including one or more first volatile memories in which data having a first bit width is collectively accessed;
a second volatile memory set including one or more second volatile memories in which data having the first bit width is collectively accessed; and
a controller connected to the first and second volatile memory sets,
wherein the controller is configured to:
allocate a first address space in which one address collectively designates data having a second bit width to the first volatile memory set,
allocate a second address space in which one address collectively designates data having a third bit width being different from the second bit width to the second volatile memory set,
in response to receiving an address that collectively designates data having the second bit width,
when the address is less than or equal to a first threshold value, select one of the first or second address space, and access at least one volatile memory of the first or second volatile memory set that corresponds to the selected address space,
when the address is larger than the first threshold value, select another one of the first or second address space, and access at least one volatile memory of the first or second volatile memory set that corresponds to the selected another address space.

7. The memory system according to claim 6, further comprising a processor,
wherein the processor is configured to access a third address space using the address, and the third address space includes the first address space and the second address space.

8. The memory system according to claim 7,
wherein the address indicates a position in the third address space in which one address collectively designates data having the second bit width, and
the controller is configure to:
based on the address,
select at least one first volatile memory of the first volatile memory set or at least one second volatile memory of the second volatile memory set,
calculate a second address in the selected address space of the first or second address space, and
access the selected at least one first volatile memory or the selected at least one second volatile memory that corresponds to the second address.

9. The memory system according to claim 8,
wherein the controller is configured to:
when the address is less than or equal to the first threshold value,
select the first address space,
calculate a first address that is equal to the address, and
access at least one first volatile memory of the first volatile memory set based on the calculated first address; and
when the address is larger than the first threshold value,
select the second address space, calculate a second address by adding the first threshold value to a third address that is obtained by doubling a difference between the address and the first threshold value, and access at least one second volatile memory of the second voltage memory set based on the calculated second address.

10. The memory system according to claim 7,
wherein the third address space is an address space in which one address collectively designates data having the second bit width.

11. The memory system according to claim 6,
wherein the controller is configured to:
generate a chip select signal for selecting at least one of the first volatile memories of the first volatile memory set or at least one of the second volatile memories of the second volatile memory set, based on the address and the first threshold value, and
access the at least one volatile memory of the first or second volatile memory set using the generated chip select signal.

12. The memory system according to claim 6,
wherein the first bit width is smaller than the second bit width, and the first bit width is smaller than the third bit width.

13. The memory system according to claim 12,
wherein the second bit width is smaller than the third bit width.

14. The memory system according to claim 12,
wherein the third bit width is smaller than the second bit width.

15. The memory system according to claim 6,
wherein the one or more first volatile memories and the one or more second volatile memories each have a plurality of memory chips.

16. The memory system according to claim 6,
wherein the one or more first volatile memories and the one or more second volatile memories each have a same capacity.

17. A method of controlling a first volatile memory in which data having a first bit width is collectively accessed, and a second volatile memory in which data having the first bit width is collectively accessed, the second volatile memory having a capacity larger than the first volatile memory, the method comprising:
allocating, to the first volatile memory, a first address space in which one address collectively designates data having the first bit width;
allocating, to the second volatile memory, a second address space in which one address collectively designates data having the first bit width;
based on a first address indicating a position in a third address space, the third address space being an address space in which one address collectively designates data having a second bit width different from the first bit width,
selecting at least one of the first or second volatile memory, and
calculating a second address in the first or second address space allocated to the selected at least one volatile memory; and
accessing a position corresponding to the second address of the selected at least one volatile memory.

18. The method according to claim 17, further comprising:
calculating the second address based on the first address and a maximum address, the maximum address being an address in the third address space that corresponds to the capacity of the first volatile memory.

19. The method according to claim 17, further comprising:
generating a chip select signal of at least one of the first or second volatile memory based on the first address and a maximum address, the maximum address being an address in the third address space that corresponds to the capacity of the first volatile memory, and
accessing the selected at least one volatile memory using the generated chip select signal.

20. The method according to claim 17,
wherein each of the first and second volatile memory includes a plurality of memory chips.

* * * * *